July 28, 1964     W. B. PEGRAM     3,142,794
DIFFERENTIAL PRESSURE TRANSDUCER
Filed May 24, 1962     2 Sheets—Sheet 1

INVENTOR.
WILLIAM B. PEGRAM
BY Donald S. Cohen
ATTORNEY

July 28, 1964 W. B. PEGRAM 3,142,794
DIFFERENTIAL PRESSURE TRANSDUCER
Filed May 24, 1962 2 Sheets-Sheet 2

INVENTOR.
WILLIAM B. PEGRAM
BY
ATTORNEY

United States Patent Office 3,142,794
Patented July 28, 1964

3,142,794
DIFFERENTIAL PRESSURE TRANSDUCER
William B. Pegram, Swarthmore, Pa., assignor to International Resistance Company, Philadelphia, Pa.
Filed May 24, 1962, Ser. No. 197,509
9 Claims. (Cl. 323—51)

The present invention relates to a transducer, and more particularly to a differential pressure transducer. This is a continuation-in-part of my co-pending application Serial No. 82,294, now Pat. No. 3,044,029 filed January 12, 1961, entitled "Transducer."

In pressure transducers, it is common to use a bellows type diaphragm to operate some type of electrical component having a variable output, such as a variable resistor or a differential transformer. In such bellows operated transducers, a change in the pressure applied to the bellows varies the length of the bellows, which in turn operates the electrical component to vary the output of the component. Thus, a variation in the output of the electrical component is directly proportional to the change in the length of the bellows. Therefore, to obtain a large variation in the output of the electrical component normally requires a large change in the length of the bellows.

When measuring or controlling small changes in pressure, it is desirable to obtain a large change in the output of the electrical component for a small change in the pressure to achieve a more accurate measurement of, and a finer control for the pressure. For this purpose it is necessary to use a bellows diaphragm which will provide a large variation in its length for a small change in pressure applied to the diaphragm. To function in this manner, the bellows would have to be either long and of a thin metal, or large in diameter. However, such long bellows are physically unstable so that they are difficult to use. Also, such bellows are readily susceptible to be changed in size by outside forces applied to the transducer, such as by gravity, vibration and shock, upon movement of the transducer. Thus, such outside forces can easily provide undesirable changes in the output of the transducer.

In my co-pending application Serial No. 82,294, there is shown and described a differential pressure transducer comprising a pair of differential transformers physically mounted in parallel relation. The movable core of each of the differential transformers is connected to the closed end of a separate bellows diaphragm. The bellows diaphragms are mounted in separate chambers so that each chamber is divided into two compartments, one compartment being around the outside of the bellows diaphragm and the other compartment including the interior of the bellows diaphragm. The compartment of each chamber which includes the interior of the bellows diaphragm is hydraulically connected to the compartment of the other chamber which is around the bellows diaphragm. Thus, the compartments of the two chambers are hydraulically "cross connected" so that the pressure applied to the interior of each of the bellows diaphragms is also applied to the exterior of the other bellows diaphragm. The windings of the differential transformers are electrically connected so that when the cores of the transformers are moved in the same direction, the electrical outputs of the transformers are of opposite polarity, and when the cores are moved in opposite directions, the outputs are of like polarity.

In the operation of this transducer, a difference in the pressure applied to the interiors of the two bellows diaphragms causes one of the diaphragms to contract and the other to expand. This moves the cores of the differential transformers in opposite directions to provide electrical outputs from the transformers of like polarity. The electrical outputs of like polarity add to provide a relatively large total electrical output of the transducer for a small change in pressure. However, any outside forces applied to the transducer, such as may be caused by shock, vibration etc., will move the cores of the differential transformers in the same direction. This causes changes in the electrical outputs of the differential transformers of opposite polarities which cancel each other out. Thus, the electrical output of the transducer is not affected by such outside forces.

Although the transducer of my co-pending application Serial No. 82,294 operates satisfactorily, it has a few disadvantages. The hydraulic "cross connection" between the bellows diaphragms requires a relatively complex structure which is relatively expensive to manufacture. Also, since the bellows diaphragms are hydraulically connected in parallel, the pressure differential permitted between the two diaphragms is limited.

It is an object of the present invention to provide a novel transducer.

It is another object of the present invention to provide a novel differential pressure transducer.

It is still another object of the present invention to provide a differential pressure transducer utilizing small bellows diaphragms which will provide a large electrical output for a small change in pressure.

It is a further object of the present invention to provide a differential pressure transducer utilizing bellows diaphragms in which the output of the transducer is not affected by outside forces applied to the transducer.

It is a still further object of the present invention to provide a differential pressure transducer for measuring larger pressure differentials.

It is still another object of the present invention to provide a differential pressure transducer which is of simpler construction so as to be less expensive to manufacture.

Other objects will appear hereinafter.

For the purpose of illustrating the invention there is shown in the drawings a form which is presently preferred; it being understood, however, that this invention is not limited to the precise arrangements and instrumentalities shown.

Figure 1:
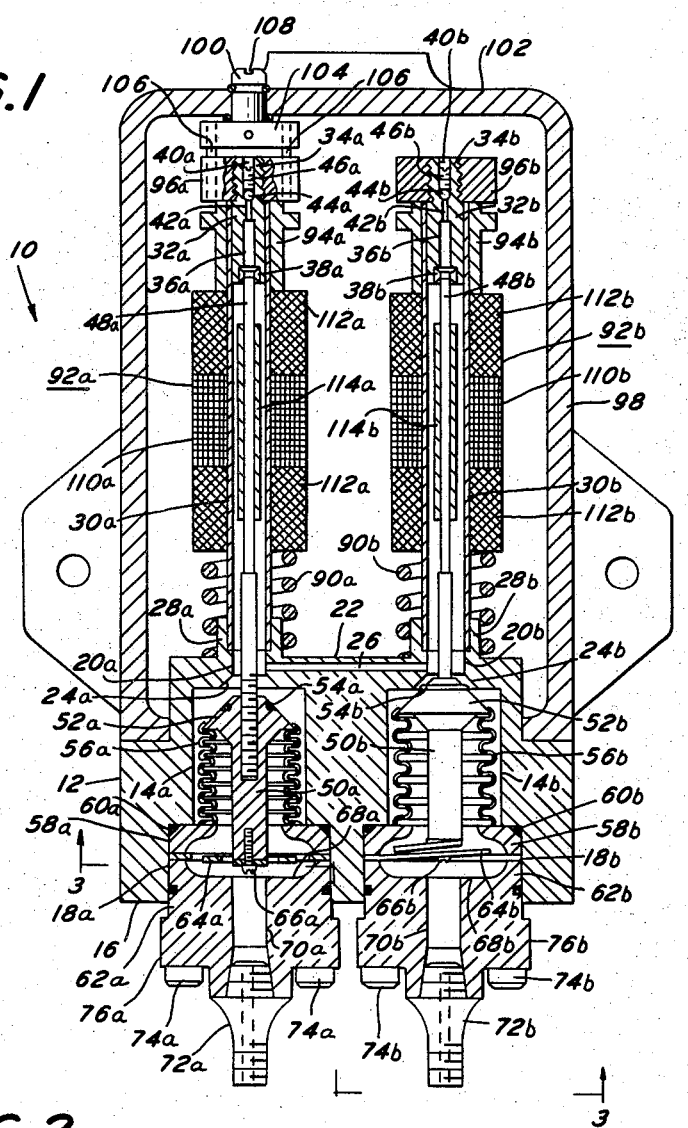
FIGURE 1 is a sectional view of the differential pressure transducer of the present invention.

Referring initially to FIGURE 1, the differential pressure transducer of the present invention is generally designated as 10.

Transducer 10 comprises a base 12 having a pair of spaced, parallel, cylindrical recesses 14a and 14b therein extending from the bottom surface 16 thereof. Cylindrical counterbores 18a and 18b are provided at the mouths of the recesses 14a and 14b respectively. Holes 20a and 20b extend through the base 12 from the bottoms of the recesses 14a and 14b respectively to the top surface 22 of the base. Holes 20a and 20b are provided at their inner ends with tapered valve seats 24a and 24b respectively. A passage 26 extends through the base 12 from the hole 20a to the hole 20b. Cylindrical bosses 28a and 28b project upwardly from the top surface 22 of the base 12 around the holes 20a and 20b respectively with the inner surfaces of the bosses 28a and 28b being spaced radially outwardly from the edges of the holes 20a and 20b.

Elongated tubular sleeves 30a and 30b of a non-magnetic material, such as an annealed non-magnetic stainless steel, have their bottom ends secured within the cylindrical bosses 28a and 28b respectively. Caps 32a and 32b are secured in the top ends of the sleeves 30a nad 30b respectively. Caps 32a and 32b have externally threaded projections 34a and 34b respectively extending upwardly beyond the top ends of the sleeves 30a and 30b. The caps 32a and 32b are provided with recesses 36a and 36b respectively extending from their inner ends, and sleeve bearings 38a and 38b are secured in the recesses 36a and 36b. Sleeve bearings 38a and 38b have longitudinal slots therethrough which provide communication between the interior of the recesses 36a and 36b above the bearings 38a and 38b and the interior of the sleeves 30a and 30b. The projections 34a and 34b of the caps 32a and 32b are provided with threaded holes 40a and 40b respectively extending from the upper ends thereof. Holes 40a and 40b are in communication with the recesses 36a and 36b respectively through small diameter passages 42a and 42b respectively. Small metal balls 44a and 44b are seated in the bottoms of the holes 40a and 40b respectively and across the upper ends of the passages 42a and 42b respectively. Set screws 46a and 46b are threaded in the holes 40a and 40b respectively, and engage the balls 44a and 44b respectively to tightly seat the balls across the passages 42a and 42b.

Elongated rods 48a and 48b of a non-magnetic metal are provided within the sleeves 30a and 30b respectively with the upper ends of the rods being slidably supported within the bearings 38a and 38b respectively. The bottom ends of the rods 48a and 48b extend into the recesses 14a and 14b respectively of the base 12, and are threadably connected to stems 50a and 50b respectively within the recesses 14a and 14b. Stems 50a and 50b are provided with conical valves 52a and 52b respectively which are adapted to seat against the valve seats 24a and 24b. Annular gaskets 54a and 54b are mounted in annular grooves in the conical surfaces of the valves 52a and 52b respectively to provide a seal between the valves and the valve seats.

Bellows diaphragms 56a and 56b are provided in the recesses 14a and 14b of the base 12, and around the stems 50a and 50b respectively. The upper ends of the bellows diaphragms 56a and 56b are secured to the bottom ends of the valves 52a and 52b respectively, and the bottom ends of the bellows diaphragms are secured to mounting rings 58a and 58b respectively. The bellows mounting rings 58a and 58b are within the counterbores 18a and 18b respectively, and are seated against the bottoms of the counterbores. Annular gaskets 60a and 60b are provided between the bellows mounting rings 58a and 58b and the walls of the counterbores 18a and 18b respectively to provide a seal therebetween. The bellows mounting rings 58a and 58b are held against the bottoms of the counterbores 18a and 18b by caps 62a and 62b respectively which are inserted in the counterbores. Flat spiral springs 64a and 64b are provided within the counterbores 18a and 18b respectively with the peripheries of the springs being clamped between the caps and the bellows mounting rings. The inner ends of the springs 64a and 64b are secured to the bottom ends of the stems 50a and 50b respectively by screws 66a and 66b respectively. Thus, the stems 50a and 50b and the rods 48a and 48b are supported on the springs 64a and 64b.

Caps 62a and 62b are provided with cup-shaped cavities 68a and 68b respectively in their top surfaces, and inlet passages 70a and 70b extending from the bottoms of the cavities 68a and 68b to the bottom ends of the caps. Inlet ports 72a and 72b are secured within the bottom ends of the inlet passages 70a and 70b respectively. Bolts 74a and 74b extend through non-circular flanges 76a and 76b respectively on the caps 62a and 62b respectively, and are threaded into the body 12 to secure the caps within the counterbores 18a and 18b.

Figure 2:
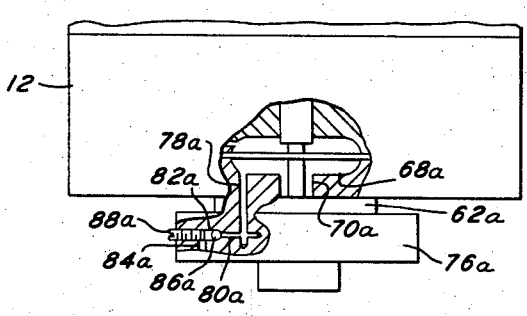
FIGURE 2 is a side elevational view, partially broken away, of the bottom portion of the differential pressure transducer of the present invention.
Figure 3:
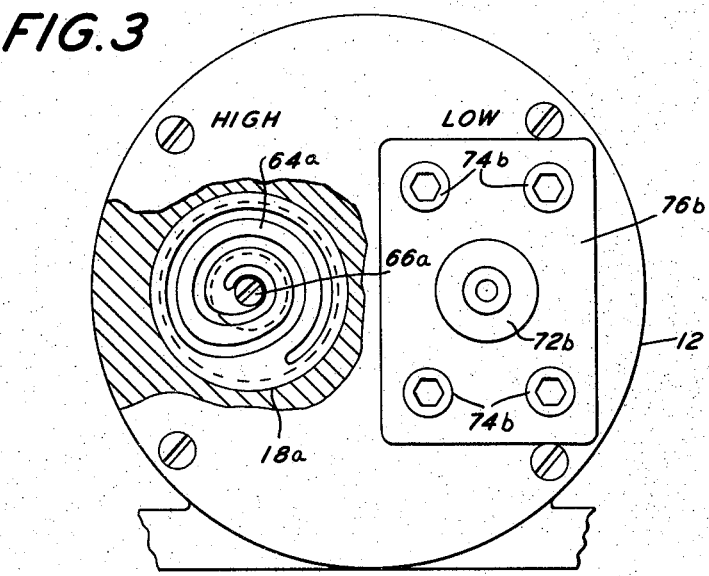
FIGURE 3 is a sectional view taken along line 3—3 of FIGURE 1.

Referring to FIGURE 2, the cap 62a is provided with a bleeder passage 78a extending from the cavity 68a to a cross-bleeder passage 80a in the flange 76a of the cap. A threaded hole 82a, which is larger in diameter than the cross-bleeder passage 80a, extends from the periphery of the flange 76a to the end of the cross-bleeder passage 80a, and a second bleeder passage 84a extends from the hole 82a to the outer surface of the flange. A small metal ball 86a is within the bottom of the hole 82a, and extends across the end of the cross-bleeder passage 80a. A set screw 88a is threaded within the hole 82a, and engages the ball 86a to seat the ball tightly across the cross-bleeder passage 80a. The cap 62b is likewise provided with such bleeder passages, threaded hole, ball and set screw.

Referring again to FIGURE 1, helical springs 90a and 90b surround the sleeves 30a and 30b respectively, and are seated on the top surface 22 of the base 12. Differential transformers, generally designated as 92a and 92b, surround the sleeves 30a and 30b respectively, and are seated on the springs 90a and 90b respectively. Cylindrical bushings 94a and 94b surround the sleeves 30a and 30b respectively above the transformers 92a and 92b, and are seated on the transformers. Adjustment nuts 96a and 96b are threaded on the projections 34a and 34b respectively of the caps 32a and 32b, and engage the top ends of the bushings 94a and 94b respectively. A cup-shaped cover 98 extends over and around the transformers 92a and 92b and the sleeves 30a and 30b, and is secured to the base 12. An adjustment rod 100 extends through and is rotatably mounted in the top 102 of the cover 98 directly over the adjustment nut 96a. An annular collar 104 is secured to the inner end of the adjustment rod 100. A pair of drive pins 106 extend downwardly from the collar 104 into holes in the adjustment nut 96a to provide a drive connection between the adjustment rod 100 and the adjustment nut 96a. The adjustment rod 100 is provided with a transverse slot 108 in its upper end to permit the insertion of a screw driver or like instrument for ease of rotating the adjustment rod.

The differential transformers 92a and 92b are each of the type shown in the United States Letters Patent No. 2,507,344, issued May 9, 1950, to W. D. MacGeorge, entitled "Differential Transformer." The differential transformers 92a and 92b each includes a central primary winding 110a and 110b respectively, and a pair of identical secondary windings 112a and 112b respectively wound along opposite sides of the primary winding. As shown in Patent No. 2,507,344, the primary and secondary windings may be wound around a bobbin of a non-magnetic material. Also, the differential transformers 92a and 92b may be each provided with a cylindrical metal sleeve around the windings and the bobbin to protect the windings from being damaged, and to provide a magnetic shield for the windings. Armature cores 114a and 114b surround and are secured to the rods 48a and 48b respectively within the sleeves 30a and 30b. Armature cores 114a and 114b are positioned on the rods 48a and 48b so as to be within the differential transformers 92a and 92b respectively.

Figure 4:
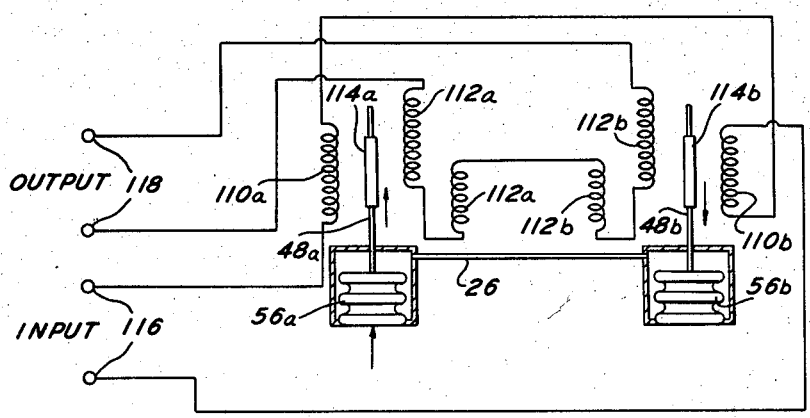
FIGURE 4 is a schematic diagram of the electrical circuit and the hydraulic circuit of the differential pressure transducer of the present invention.

Referring to FIGURE 4, the primary windings 110a and 110b of the transformers 92a and 92b are connected in series between the input terminals 116 of the transducer 10. The two secondary windings 112a of the transformer 92a are connected in series bucking relation, and the two secondary windings 112b of the transformer 92b are connected in series bucking relation. By series bucking relation it is meant that when a voltage is applied across the primary winding of the transformer, the voltage induced across one of the secondary windings is of a polarity opposite to the voltage induced across the other secondary winding. The two secondary windings 112a of the transformer 92a and the two secondary windings 112b of the transformer 92b are connected to the output terminals 118 of the transducer 10 so that the secondary windings 112a are in bucking series relation to the secondary windings 112b. The input terminals 116 and the output terminals 118 are suitable connectors which extend through and are electrically insulated from the cover 98.

The portions of the recesses 14a and 14b in the base 12 around the outside of the bellows diaphragms 56a and 56b, the sleeves 30a and 30b, and the passage 26 are all filled with a liquid, such as water. The recesses 14a and 14b, sleeves 30a and 30b, and passage 26 are filled with the liquid through the caps 32a and 32b in the sleeves 30a and 30b by removing the set screws 46a and 46b and the balls 44a and 44b. The liquid may be inserted through one of the caps, with the other cap permitting the escape of air.

The transducer 10 of the present invention operates as follows:

Considering first the operation of the differential transformer 92a, when an input voltage is applied across the primary winding 110a, and the armature core 114a is positioned so that it extends across the same number of turns of each of the secondary windings 112a, the voltage induced across each of the secondary windings 112a will be of equal magnitude, but of opposite polarity. Thus, the voltages induced across the secondary windings 112a will balance each other so that the output of the differential transformer 92a will be zero. This position of the armature core 114a is known as its "null position." If the armature core 114a is moved upwardly from its null position, the armature core will then be extending across more turns of the upper secondary winding 112a and fewer turns of the lower secondary winding 112a. Therefore, the voltage induced across the upper secondary winding will be greater than the voltage induced across the lower secondary winding so that the output of the differential transformer 92a will be the difference between the voltages induced in the secondary windings and of a polarity according to the direction of the turns of the upper secondary winding. Likewise, if the armature core 114a moves downwardly from its null position, the voltage induced across the lower secondary winding 112a will be greater than that induced across the upper secondary winding 112a, so that the output of the differential transformer 92a will be the difference between the two voltages and of a polarity opposite to that produced when the voltage across the upper secondary winding is greater. The differential transformer 92b operates in the same manner as the differential transformer 92a. Thus, when the armature core 114b moves upwardly from its null position, an output voltage is provided across the secondary windings 112b of a polarity according to the direction of the turns of the upper secondary winding, and when the armature core 114b moves downwardly from its null position, an output voltage is produced which is of a polarity according to the direction of the turns of the lower secondary winding 112b.

Now considering both of the differential transformers 92a and 92b together, when both of the armature cores 114a and 114b are moved a uniform distance upwardly from their null positions, a voltage will be produced across each of the sets of secondary windings 112a and 112b of equal magnitude and of the same polarity. Likewise, when both of the armature cores 114a and 114b are moved downwardly the same distance from their null positions, a voltage will be produced across each pair of the secondary windings 112a and 112b of the same magnitude and of the same polarity. However, as previously stated, the secondary windings 112a of the transformer 92a are connected in series bucking relation to the secondary windings 112b of the transformer 92b. Thus, when the polarity of the outputs of both of the pairs of secondary windings 112a and 112b are the same, the bucking series connection between the two sets of secondary windings causes the outputs of the secondary windings to balance each other out. Therefore, equal movement of both of the armature cores 114a and 114b, either upwardly or downwardly, will produce a change in the outputs of the differential transformers 92a and 92b of equal magnitude and same polarity so that the changes will completely balance each other and produce no change across the output terminals 118 of the transducer 10. Unequal movement of the two armature cores 114a and 114b either upwardly or downwardly, will produce a change in the voltage across the output terminals 118 which is proportional to the difference in the movement of the armature cores. However, if the armature core 114a moves upwardly and the armature core 114b moves downwardly, or the armature core 114a moves downwardly and the armature core 114b moves upwardly, voltages will be induced across the secondary windings 112a and 112b of opposite polarity. Since the secondary windings 112a and 112b are connected in series bucking relation, the voltages across the secondary windings of opposite polarity will add together to provide a voltage across the output terminals 118 of the transducer 10 equal to the total of the output voltages across both the secondary windings 112a and 112b.

During the assembling of the transducer 10 of the present invention, the transformers 92a and 92b are positioned along the sleeves 30a and 30b so as to provide a zero electrical output from the transducer when equal pressures are applied within the bellows diaphragms 56a and 56b. This is achieved by applying equal pressures to the interior of the bellows diaphragms 56a and 56b, and rotating the adjustment nuts 96a and 96b to slide the transformers 92a and 92b along the sleeves 30a and 30b until the armature cores 114a and 114b are each at their null positions. However, after the transducer 10 is completely assembled, a final adjustment of the output of the transducer can be obtained by means of the adjustment rod 100. By rotating the adjustment rod 100, the adjustment nut 96a is rotated to move the transformer 92a with respect to the armature core 114a. Thus, the output from the transformer 92a can be adjusted to balance the output from the transformer 92b so as to provide a zero output from the transducer 10.

With both of the differential transformers 92a and 92b being properly positioned with respect to the armature cores 114a and 114b respectively, the inlet port 72a of the transducer 10 can be connected to one source of pressure to be measured, and the inlet port 72b can be connected to another source of pressure. One of the inlet ports 72a and 72b can be left open to the atmosphere, or both of the inlet ports can be connected to different sources of pressure, such as on opposite sides of a Venturi in a flow line. When the inlet ports 72a and 72b are connected to a source of pressure other than air pressure, it is desirable to remove any air within the bellows diaphragms 56a and 56b. The removal of any air entraped within the bellows diaphragm 56a can be achieved by threading the set screw 88a away from the ball 86a to open the bleeder passages 78a and 80a to the bleeder passage 84a. Once all of the air is bled from within the bellows diaphragm 56a, the set screw 88a is threaded inwardly to seat the ball 86a back across the bleeder passage 80a. Any air within the bellows diaphragm 56b can be likewise removed through the bleeder passages in the cap 76b.

If the inlet ports 72a and 72b are connected to sources of pressure of equal magnitude, the electrical output of the transducer 10 will be zero. If the source of pressure connected to one of the inlet ports, for example the inlet port 72a, increases in magnitude, the bellows diaphragm 56a will be expanded. Since the liquid within the portion of the recess 14a around the bellows diaphragm 56a is non-compressible, expansion of the bellows diaphragm 56a causes some of the fluid to flow through the passage 26 into the portion of the recess 14b around the bellows diaphragm 56b. The flow of the additional fluid into the recess 14b applies a pressure onto the outside of the bellows diaphragm 56b causing the bellows diaphragm 56b to contract. Expansion of the bellows diaphragm 56a moves the rod 48a and the armature core 114a upwardly from the null position of the armature core 114a, and contraction of the bellows diaphragm 56b moves the rod 48b and the armature core 114b downwardly from the null position of the armature core 114b. As previously described, movement of the armature cores 114a and 114b in opposite directions from their null positions provides an output across the output terminals 118 of the transducer 10 equal to the total output across the transformers 92a and 92b. Similarly, if the pressure to the inlet port 72a remains constant and the pressure to the inlet port 72b increases, the bellows diaphragm 56b will expand causing the fluid to flow from the recess 14b through the passage 26 into the recess 14a. The flow of the fluid into the recess 14a causes contraction of the bellows diaphragm 56a. The expansion of the bellows diaphragm 56b moves the armature core 114b upwardly, and the contraction of the bellows diaphragm 56a moves the armature core 114a downwardly. The movement of the armature cores 114a and 114b in opposite directions provides an output from the transducer 10 equal to the total outputs of the transformers 92a and 92b. Thus, a change in pressure to either of the inlet ports 72a and 72b causes an expansion of one of the bellows diaphragms 56a and 56b, and a contraction of the other bellows diaphragm to move the armature cores 114a and 114b in opposite directions and provide an electrical output across the output terminals 118 of the transducer 10 equal to the total of the outputs of the transformers 92a and 92b. Since the action of the increase in pressure is divided between the two bellows diaphragms 56a and 56b, each of the bellows diaphragms will move only a small amount. However, the small movement of each of the bellows diaphragms produces a relatively large electrical output from the transducer 10. Thus, the transducer 10 of the present invention uses small, stable bellows diaphragms, yet achieves relatively large electrical outputs for small changes in pressure.

Although the operation of the transducer 10 of the present invention has been described with the change in pressure to one of the inlet ports 72a and 72b being an increase in pressure, the transducer 10 will operate in a similar manner if the pressure to one of the inlet ports decreases. A decrease in pressure to one of the inlet ports is in essence an increase in pressure to the other inlet port. Also, although the operation of the transducer 10 of the present invention has been described with the armature cores 114a and 114b being initially at their null positions, the transducer 10 will operate in a similar manner with either or both of the armature cores being initially displaced from its null position. In such an instance, the transducer 10 will have an initial electrical output across its output terminals 118 depending on the displacement of the armature cores 114a and 114b. Any change in pressure to either of the inlet ports 72a and 72b will cause a movement of the armature cores 114a and 114b to change the electrical output across the output terminals 118. Thus, the transducer 10 will show a change in pressure by a change in its electrical output. Furthermore, if the pressure to both of the inlet ports 72a and 72b change simultaneously, the armature cores 114a and 114b will be displaced in a manner according to the difference in the changes in the pressures so that the transducer 10 will provide a change in output corresponding to the differential pressure across the inlet ports. Thus, if both of the pressures change, but the difference between the pressures stays the same, there will be no change in the electrical output across the output terminals 118 of the transducer 10.

Expansion of the bellows diaphragms 56a and 56b is limited by the seating of the valves 52a and 52b in the valve seats 24a and 24b. Since the seating of one of the valves in its valve seat stops the flow of liquid through the passage 26, this not only limits the expansion of the expanding bellows diaphragm, but also limits the contraction of the other bellows diaphragm. Thus, the valves provide a safety device to prevent damage to the bellows diaphragms by over expansion or contraction in the event of a sudden large change in pressure to one of the inlet ports. Such a large change in pressure may be caused by a breaking of one of the lines to one of the inlet ports which would apply atmospheric pressure to one of the bellows diaphragms while the other bellows diaphragm is still connected to a much higher pressure, or by a sudden large change in the pressure applied to either of the inlet ports. Since the bellows diaphragms 56a and 56b are hydraulically connected in series, the pressure differential across the inlet ports 72a and 72b is equal to the total pressure differential across each of the bellows diaphragms. Thus, the pressure differential across the inlet ports 72a and 72b can be higher than the pressure differential across the inlet ports of the transducer of my copending application Serial No. 82,294 in which the bellows diaphragms are hydraulically connected in parallel.

In the use of the transducer 10 of the present invention, the output terminals 118 may be connected across an electric meter to measure the electrical output of the transducer 10. By properly calibrating the electric meter, the meter will record the pressure or pressure differential applied to the inlet ports 72a and 72b of the transducer 10. Thus, the transducer 10 of the present invention can be used to measure pressures or pressure differentials. The transducer 10 of the present invention can also be used to control the pressure of a fluid or gas in a chamber or flow line, or the rate of flow of a fluid or gas through a flow line. For this purpose, the inlet ports 72a and 72b are connected to the chamber or flow line, and the output terminals 118 of the transducer 10 are connected through appropriate instrumentation to an electrically controlled valve leading to or within the chamber or flow line. A change in pressure in the chamber or flow line will be applied to the bellows diaphragms 56a and 56b of the transducer 10 to vary the positions of the armature cores 114a and 114b and thereby change the electrical output across the output terminals 118. Such a change in the electrical output across the output terminals of the transducer 10 will operate the valve in a manner to compensate for the change in pressure in the chamber or flow line. Since the transducer 10 can provide electrical outputs of different polarity, the transducer 10 of the present invention can operate a valve to compensate for either increases or decreases in the pressure or pressure differential being measured.

Since the two differential transformers 92a and 92b, and the armature cores 114a and 114b are physically in parallel, any physical movement of the transducer 10 which which may cause movement of the armature cores 114a and 114b will move the armature cores in the same direction. As previously stated, movement of the armature cores 114a and 114b in the same direction provides output from the transformers 92a and 92b which will cancel each other. Thus, movement of the armature cores 114a and 114b like distances in the same direction will have no effect on the electrical output of the transducer 10. In addition, the spiral springs 64a and 64b are each of a stiffness according to the stiffness to diameter ratio of its respective bellows diaphragm 56a and 56b so that the bellows diaphragms will have the same linear expansion or contraction per same increment of pressure. This insures that any change in the volume of the fill liquid, which may be caused by a high line pressure or a change in the temperature of the fill liquid, will automatically provide the same travel of each of the armature cores 114a and 114b to produce a zero change in the electrical output of the transducer 10. Therefore, movement of the armature cores 114a and 114b of the transducer 10 of the present invention because of such forces as gravity, vibration and shock, or by changes in the volume of the fill liquid will not affect the output of the transducer 10 so that only changes in the pressure applied to the inlet ports 72a and 72b will be recorded as a change in the electrical output of the transducer 10.

The present invention may be embodied in other specific forms without departing from the spirit or essential attributes thereof and, accordingly, reference should be made to the appended claims, rather than to the foregoing specification as indicating the scope of the invention.

I claim:

1. A pressure transducer comprising a pair of parallel armature cores of a magnetic material, a separate differential transformer around each of said armature cores, each of said transformers including a primary winding and a pair of secondary windings, the secondary windings of each of said transformers being electrically connected in series bucking relation, the secondary windings of one of said transformers being electrically connected to the secondary windings of the other transformer in series bucking relation, the primary windings of said transformers being electrically connected together, a pair of chambers, a separate diaphragm secured across each of said chambers, means connecting an end of each of said armature cores to one side of a separate one of said diaphragms, means hydraulically connecting the portions of said chambers on the one side of said diaphragms, and means for applying a pressure to be measured to the other side of at least one of said diaphragms.

2. A pressure transducer in accordance with claim 1 in which each of the diaphragms is a bellows diaphragm having an opening end and a closed end, the armature cores are connected to the closed ends of the diaphragms, and the portions of the chambers around the outside of the diaphragms are hydraulically connected together.

3. A pressure transducer in accordance with claim 2 including separate valve means connected to each of said bellows diaphragms and adapted to close the hydraulic connection between the chambers upon a predetermined amount of expansion of the bellows diaphragms.

4. A pressure transducer comprising a base having a pair of spaced parallel recesses in one side thereof, a separate bellows diaphragm in each of said recesses, one end of each of said bellows diaphragms being sealed across its recess to divide the recesses into two compartments, separate means closing the other end of each of said bellows diaphragms, a passage through said base connecting the compartments of said recesses which are around the outside of said bellows diaphragms, a liquid filling the compartments of said recesses which are around the outside of the bellows diaphragms and the passage between said compartments to provide a hydraulic connection between said diaphragms, a pair of armature cores of a magnetic material arranged in spaced parallel relation with the longitudinal axis of each of the armature cores being in alignment with the longitudinal axis of a separate one of said recesses, means connecting each of said armature cores to a separate one of the means closing the other ends of the bellows diaphragms so that contraction and expansion of said bellows diaphragms moves said armature cores longitudinally, and a separate differential transformer mounted around each of said armature cores, each of said differential transformers including a primary winding and a pair of secondary windings, the secondary windings of each of said transformers being electrically connected in series bucking relation, the secondary windings of one of said transformers being electrically connected to the secondary windings of the other transformer in series bucking relation, and the primary windings of said transformers being electrically connected together.

5. A pressure transducer in accordance with claim 4 in which the base has a separate hole therethrough extending from the bottom of each of the recesses, the passage connecting the recesses extends between said holes, and a separate elongated sleeve of a non-magnetic material is secured at one end within each of said holes, means closing the other end of each of said sleeves, said sleeves being filled with the hydraulic liquid, each of the armature cores being within a separate one of said sleeves and each of the differential transformers being mounted around a separate one of said sleeves.

6. A pressure transducer in accordance with claim 5 in which the means closing the other ends of each bellows diaphragm comprises a separate stem within each of the bellows diaphragms, each of said stems having a conical valve on its end adjacent the bottom of the recess, the other end of each of the bellows diaphragms being secured around and to the valve, and a conical valve seat in the bottom of each recess around the hole, each of said valves seating in a valve seat upon expansion of the bellows diaphragms a predetermined amount to seal the recesses from the connecting passage.

7. A pressure transducer in accordance with claim 6 in which the means connecting each of the armature cores to a stem comprises a separate elongated rod of a non-magnetic material mounted within each of the sleeves for longitudinal movement, one end of each of the rods being connected to a separate one of the stems, and each of the armature cores extending around and secured to a separate one of the rods.

8. A pressure transducer in accordance with claim 7 including separate means for adjusting the position of each of the differential transformers along its respective sleeve.

9. A pressure transducer in accordance with claim 8 including a cover extending over and around the differential transformers and secured to the base, and means extending through said cover to permit operation of one of the differential transformer position adjusting means.

References Cited in the file of this patent

UNITED STATES PATENTS 2,932,972    Cosby et al. _____ Apr. 19, 1960